(12) United States Patent
Agresta

(10) Patent No.: US 12,228,110 B2
(45) Date of Patent: Feb. 18, 2025

(54) DUTY CYCLE REDUCER SYSTEM

(71) Applicant: Ferdinando Anthony Agresta, Shoalhaven (AU)

(72) Inventor: Ferdinando Anthony Agresta, Shoalhaven (AU)

( * ) Notice: Subject to any disclaimer, the term of this patent is extended or adjusted under 35 U.S.C. 154(b) by 0 days.

(21) Appl. No.: 18/839,433

(22) PCT Filed: Jul. 28, 2023

(86) PCT No.: PCT/AU2023/050709
§ 371 (c)(1),
(2) Date: Aug. 18, 2024

(87) PCT Pub. No.: WO2024/168376
PCT Pub. Date: Aug. 22, 2024

(65) Prior Publication Data
US 2024/0426282 A1    Dec. 26, 2024

(30) Foreign Application Priority Data

Feb. 13, 2023 (AU) .................... 2023900343

(51) Int. Cl.
*F03G 3/00* (2006.01)
*F03G 7/10* (2006.01)

(52) U.S. Cl.
CPC ............. *F03G 3/094* (2021.08); *F03G 7/10* (2013.01)

(58) Field of Classification Search
CPC .................. F03G 3/094; F03G 7/10
See application file for complete search history.

(56) References Cited

U.S. PATENT DOCUMENTS

| | | | |
|---|---|---|---|
| 4,372,123 A | 2/1983 | Austin | |
| 6,237,342 B1 | 5/2001 | Hurford | |
| 2003/0066382 A1 | 4/2003 | Love | |
| 2005/0193728 A1* | 9/2005 | Newman | F03G 7/10 60/398 |
| 2007/0035134 A1 | 2/2007 | Bristow, Jr. | |
| 2008/0174121 A1 | 7/2008 | Wattenbarger | |
| 2012/0203916 A1 | 8/2012 | Vuong | |
| 2013/0207403 A1 | 8/2013 | Eichhorn | |

FOREIGN PATENT DOCUMENTS

| | | |
|---|---|---|
| DE | 10 2019 132 220 A1 | 5/2021 |
| KR | 20050035050 A | 4/2004 |

* cited by examiner

*Primary Examiner* — Terence Boes

(57) ABSTRACT

A motor continuously operating is a one hundred percent duty cycle motor. High duty cycle could detrimentally lower a motor's life expectancy and is therefore a problem. A means of solving said problem can be a system for use with a motor that reduces the proportion of a rotation during which said motor operates whilst rotation continues to be maintained by a system characterised by having a rotary shaft connected to two forms with misalignment between the cross-sectional longitudinal axis of one to the cross-sectional longitudinal axis of the other, and by having the rotary shaft with means to connect to a pawl and ratchet system which can be connected to a motor's shaft, and by having the rotary shaft also connected to a further ratchet with means to operate with a pawl, and with the rotary shaft having means to connect to a driver gear.

5 Claims, 4 Drawing Sheets

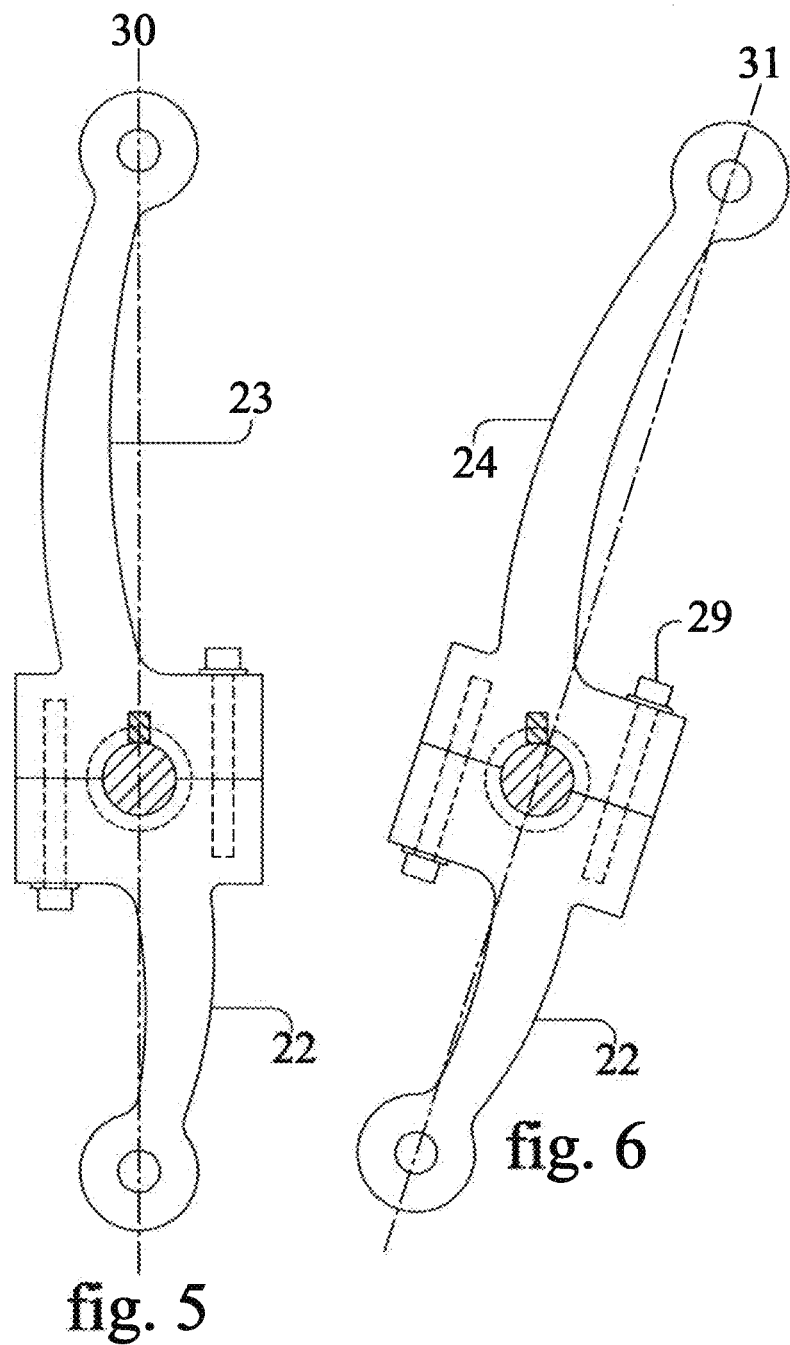

DUTY CYCLE REDUCER SYSTEM

TECHNICAL FIELD

Embodiments of this disclosure relate to a duty cycle reducer system which can operate with a motor and can be particularly useful in reducing a motor's duty cycle for commencement and during each rotation and thus improving the functioning of the motor per se. The technical field of this invention is mechanics, physics, gravity and rotation.

BACKGROUND

Duty cycle can be the proportion of a rotation during which a motor operates to maintain rotation. A motor that provides the running torque and runs continuously is a one hundred percent (100%) duty cycle motor. High duty cycle could detrimentally affect a motor's life expectancy by lowering that motor's operating life. Further, a 100% duty cycle motor could require high maintenance and frequent replacement of parts culminating in continuous high operating costs. Accordingly, it can be desirable to increase efficiency and it can be useful for a motor's duty cycle to be reduced whilst simultaneously not detrimentally impacting on what the motor is used for such as rotating a generator's shaft.

Extensive and exhaustive searches by the inventor of this invention of prior art, described and/or illustrated within general literature and published local and international patent databases, evidenced no description or illustration of a system as described in this document and/or as shown in page 1/4 to 4/4 in the Drawings.

DISCLOSURE OF INVENTION

This invention discloses a duty cycle reducer system characterised by having a rotary shaft connected to two forms having each form characterised by having the length between one end of the cross-sectional longitudinal axis to the rotary shaft's axis of rotation dissimilar to the length between the other end of the cross-sectional longitudinal axis to the rotary shaft's axis of rotation and with misalignment between the cross-sectional longitudinal axis of one of the two forms to the cross-sectional longitudinal axis of the other of the two forms, and by having the rotary shaft connected to a different form connected to a pawl and ratchet system that can connect to a motor's shaft, and by having the rotary shaft connected to a further ratchet which can operate with a pawl, and with the rotary shaft that can connect to a driver gear.

The misalignment between the cross-sectional longitudinal axis of the two forms at P. 1, L. 26 to P. 2, L. 1 above is approximately 18 degrees.

The word form defines any structure which is capable of performing its defined function.

The words generator and motor are written in this document. However, neither a generator nor a motor in any form or description is a part of this invention. The words generator and motor were written in this document only in regards to Industrial Applicability and/or Utility and to describe how this invention can operate.

The core difference between prior art and this invention is the two forms as characterised and misaligned, described at P. 1, L. 23 to P. 2, L. 8 above, which, by being connected to the rotary shaft which is also connected to the pawl and ratchet system that can be connected to a motor's shaft and with the rotary shaft further connected to a further ratchet, enables the consequence described at activity numbered (6) to occur when each activity numbered (1) to (5) described at P. 2, L. 22 to P. 3, L. 16 is caused to occur previously then activity numbered (6).

Prior to and during operation of this invention with a motor, the following two activities as relevant are to be caused to occur:

(1) at all material times the combination of said rotary shaft, the two forms, and ratchet 19 are prevented from rotating in reverse by the ratchet 19 operating with the pawl 20;

(2) in addition to (1) above, and prior to the motor starting, the imaginary cross-sectional longitudinal axis 32 midway between axis 30 and axis 31, as best shown in FIG. 7, is positioned as shown by line 36 in FIG. 9. Line 36 is 5.67 radians clockwise from line 37 which is 0.03 radians from line 35 which is the perpendicular to line 34. Line 34 represents the rotary shaft's cross-sectional horizontal axis. The said positioning of axis 32 occurs simultaneously with the positioning of the rotary shaft and the two forms as misaligned. The said position of axis 32 at line 36 is retained by operation of the pawl 20 into a cog of the ratchet 19; and (3) subsequent to (2) above, the motor's shaft can start to rotate simultaneously with the imaginary cross-sectional longitudinal axis 32 from line 36 to line 37, as best shown in FIG. 9. The said rotation of axis 32 occurs simultaneously with rotation of the rotary shaft and the two forms as misaligned and the ratchet 19; and (4) on completing (3) above, the motor's shaft can stop rotating notwithstanding that the imaginary cross-sectional longitudinal axis 32 continues to rotate from line 37 to in the range 5.76 to 6.02 radians by the operation of the enclosed pawl and ratchet system 13 together with the principle described at P. 3, L. 27 to P. 4, L. 4 below. The said continuation of rotation of axis 32 occurs simultaneously with rotation of the rotary shaft and the two forms as misaligned and ratchet 19; and (5) subsequent to (4) above, the imaginary cross-sectional longitudinal axis 32, together with the respective position of the rotary shaft and the two forms as misaligned and ratchet 19, can never be at rest less than 5.76 radians, as best shown by line 36 in FIG. 9, by the activity described at (1) together with (2) above; accordingly (6) the consequence of causing (1) to (5) above to occur is that it is open for a motor to only provide torque for the motor's shaft to rotate for the radians of each rotation from line 36 to line 37, as described at (3) above, thereby reducing the proportion of a rotation during which the motor operates at commencement of rotation and whilst rotation is maintained and thereby reducing the motor's duty cycle to approximately 9% of each rotation.

By carrying out activity numbered (2) at P. 2, L. 24 to P. 3, 1 . . . 2 above prior to the motor starting, then this invention can operate with a motor only operating to commence rotation and for a portion of each rotation thereby reducing the motor's duty cycle for each rotation and can be a solution to the problem identified at P.1, L. 11 to 14 above.

The principle adopted for this invention was the well-established principle of angular (rotational) momentum which, in this instance, in regards to Industrial Applicability and Utility, was the product of the combined moment of inertia of the rotary shaft 1, the two forms as misaligned, and ratchet 19 and the square of their combined rotary velocity. Prior art includes, and a person skilled in the art should know, that velocity and moment of inertia are linked variables in the principle of angular (rotational) momentum. Accordingly, one variable, such as velocity, could be by gravity, or partly by gravity, whilst the other variable could be by the moment of inertia of the said combination. The moment of inertia of said combination could be varied by varying any mass or form, or by varying the distance between the rotary shaft's horizontal axis of rotation and the centroid of each mass or form.

BRIEF DESCRIPTION OF DRAWINGS

For the purpose of Industrial Applicability and/or Utility and the drawings and this description, the inventor chose the two forms to be shown as two pairs of rods with each pair having two connected rods having dissimilar cross-sectional longitudinal axis length and having dissimilar weights approximately at each non-connected cross-sectional longitudinal axis end to the rotary shaft.

FIG. 3 also shows that rotary shaft 1 can be connected to a motor's shaft via the rotary shaft 1 connected to form 12 connected to the pawl and ratchet system 13 connected to form 14 which has a hole 38 into which a motor's shaft can be inserted into and secured by a grub screw, not shown, in hole 15. The positioning and securing of the combination of form 12, 13 and 14 along the rotary shaft 1 can be via a nut 11 together with a spring washer (not shown). Ratchet 19 is distanced away from the external face of the bearings 7 via two spacers 16 and 40. Ratchet 19 is connected to rotary shaft 1 via key 5 partially housed into rotary shaft land partially housed into ratchet 19. Ratchet 19 can be prevented from moving horizontally via a spacer (not shown) between the outer face of ratchet 19 and the inner end of the thread at the end of rotary shaft. A lock nut (not shown) can be connected to rotary shaft 1 preventing the spacer (not shown) from moving horizontally. Form 17 can be connected to frame 33 via bolts 18. Pawl 20 is connected to form 17 via a bolt 21, shown by fi, 1. When a driver gear is required then the spacer (not shown) is removed and replaced by the driver gear connected to the rotary shaft 1 via a key (not shown) partially housed into rotary shaft housing 6 and partially housed into the driver gear. The lock nut (not shown) is again connected to rotary shaft 1.

FIG. 5 is a cross sectional elevation of one of the two forms showing it as a combination of two dissimilar length rods, and showing the cross-sectional longitudinal axis 30 and orientation of key 3 which secures the misalignment between axis 30 to axis 31, shown in FIG. 7 and FIG. 8.

FIG. 6 is a cross sectional elevation of the other of the two forms showing it as a combination of two dissimilar length rods, and showing the cross-sectional longitudinal axis 30 and orientation of key 3 which secures the misalignment between axis 30 to axis 31, shown in FIG. 7 and FIG. 8.

BEST MODE FOR CARRYING OUT THIS INVENTION

Figure 1:
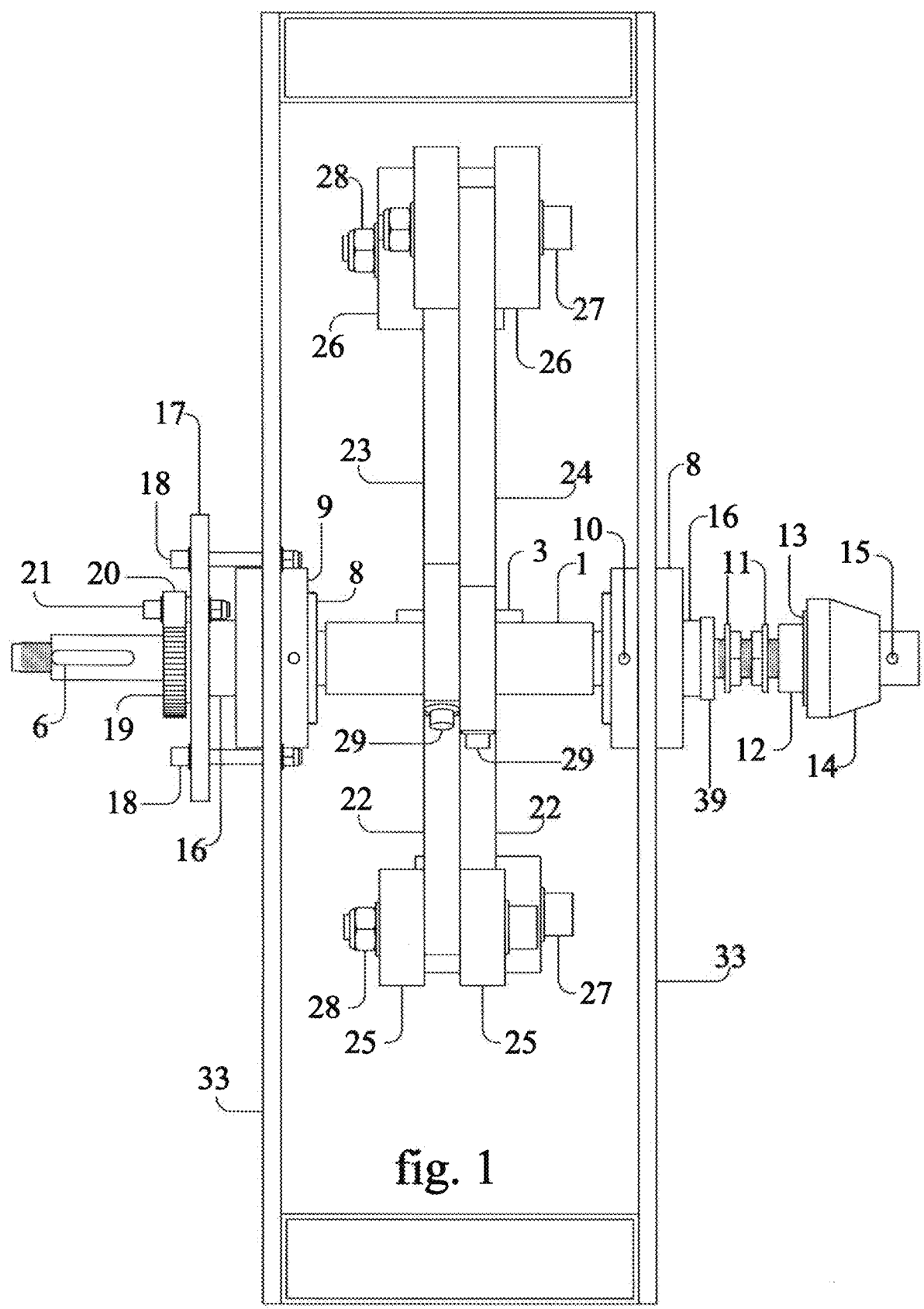
FIG. 1 is an end elevation and shows weights 25 connected to rotating shaft 1 via the non-connected end of rods 22, and shows weights 26 which are dissimilar to weights 25 connected to rotary shaft 1 via the non-connected end of rod 23 and rod 24.
Figure 4:
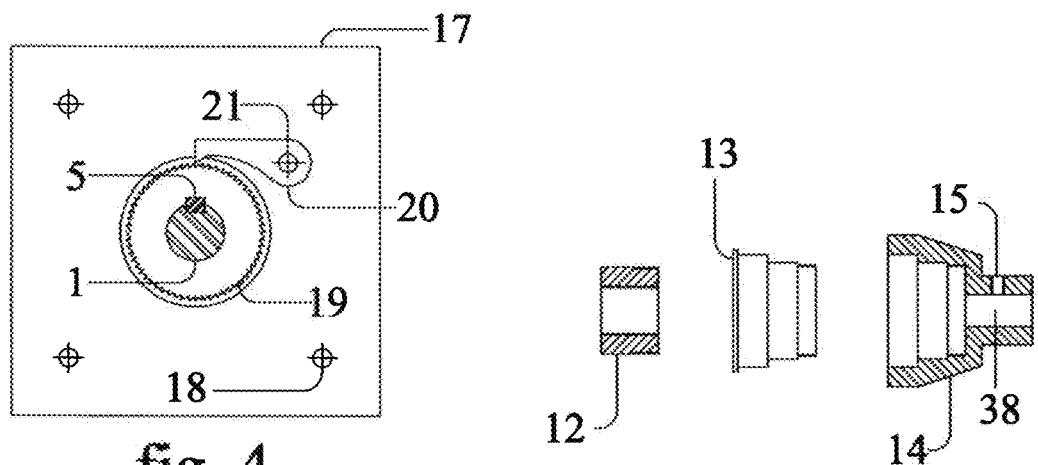
FIG. 4 is an elevation showing ratchet 19 connected to rotary shaft 1 via key 5 partially housed into rotary shaft land partially housed into ratchet 19, and showing form 17 connected to frame 33 (not shown) via bolts 18. Pawl 20 is connected to form 17 via a bolt 21.

To describe not only the structure as shown in the drawings but also the function of the various parts of this invention, the reader should commence with the description of the difference between prior art and this invention at P. 2, L. 13 to 19, which should be followed by the description of each of the two forms at P. 4, L. 7 to 10 and which should be followed by the principle used to invent this invention described at P. 3, L. 27 to P. 4, L.4 and which should be followed by the six activities described at P. 2, L. 22 to P. 3, L. 22, then the description at P. 6, L.9 to P. 9, L. 9 below.

The rotary shaft can have an outside diameter of approximately 50 mm and a length of approximately 350 mm. Each shorter length form can be approximately 150 mm between the connected end and the centre of the hole of the weights 25 and in proportion (in the range 0.5 to 0.75 and preferably 0.618) to each longer length form. The mass of each shorter length form can be approximately 1.03 kg and in proportion (in the range 1.58 to 1.85 and preferably 1.76) to the mass of each weight 25, and in proportion (in the range 0.04 to 0.58 and preferably 0.58) to each weight 26.

Each form and weight is preferably made of metal but can be made of other material not limited to plastic.

It will be understood that the invention disclosed and shown in the drawings extends to all alternative combinations.

It will also be understood that this invention, as summarised, described and shown in the drawings, extends to all alternative combinations of two or more of the individual features mentioned or evident from the text. All of these different combinations constitute various alternative aspects of this invention.

While this invention has been particularly described and shown, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The term "approximately" in reference to a numerical value for a particular parameter is inclusive of the numerical value and a degree of variance from the numerical value that a person skilled in the art would adopt. A "term" or word in the singular can mean that "term" or word in the plural. The term "gear" can mean pulley.

Figure 3:
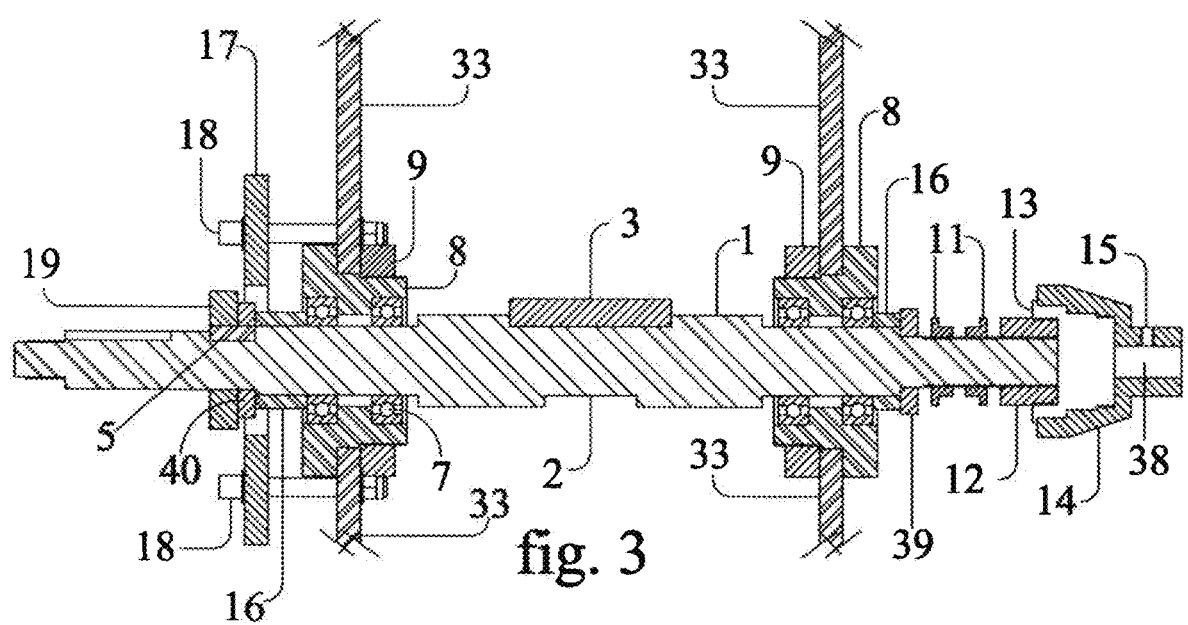
FIG. 3 is a cross-section taken through rotary shaft 1 and shows rotary shaft 1 mounted on bearings 7 via two flanges 8 which can be connected to a frame, which could be 33, via a hole in said frame and shows each flange 8 secured to frame 33 via a nut 9 and a grub screw, not shown, in hole 10.

By the inventor the best mode for carrying out this invention, as described and as shown in the drawings, when it is to operate with a motor, can be to follow the subsequent twenty six step by step process:

(1) a frame 33 which can be as shown in FIG. 1 is assembled; then (2) on the side of the frame 33 where form 17 is to be connected, the first flange 8 is inserted from outside of the frame 33 and into the hole in the frame 33, as shown in FIG. 1, then (3) a nut 9 is threaded onto the thread of the flange 8, described at (2) above, until the flange 8 is secured to the frame 33, then a grub screw is threaded into hole 10; then (4) the second flange 8 is positioned along shaft 1, as shown in FIG. 3; then (5) the end of shaft 1 which is to be inserted through the bearings within the flange described at (2) is inserted from outside of the frame through the hole where the second flange is to be positioned and towards the inner face of the first flange 8 described at (2) above; then (6) prior to shaft 1 being inserted into the bearings the second flange 8 is inserted from outside of the frame 33 and into the hole in the frame 33, as shown in FIG. 1, then (7) the other nut 9 is threaded onto the thread of the flange 8, described at (6) above, until flange 8 is secured to the frame 33, then a grub screw is threaded into hole 10; then (8) the said shaft 1 is inserted further towards flange 8 as described at (2) until housing 2 is positioned as shown in FIG. 3; then (9) spacer 16 is mounted onto shaft 1 with one end butting against the outer face of the bearing 7 within flange 8 as described at (2), then

(10) form 17 is connected via bolts 18 to the frame 33, then

(11) key 5 is partially inserted into housing 4; then

(12) form 40 and ratchet 19 are mounted over key 5 and shaft 1 and with the inner face of form 40 butting against the outer face of spacer 16. Ratchet 19 can be prevented from moving horizontally via a temporary spacer (not shown) between the outer face of ratchet 19 and the inner end of the thread at the end of rotary shaft. A lock nut (not shown) can be connected to rotary shaft 1 preventing the spacer (not shown) from moving horizontally; then

(13) pawl 20 is connected via bolt 21 to form 17, then

(14) the second spacer 16 and form 39 are mounted onto shaft 1 with one end of the spacer butting against the outer face of the bearing 7 within flange 8 as described at (4), then

(15) a spring washer (not shown) is positioned between the outer face of form 39 and the inner face of nut 11 which is threaded onto and along shaft 1, as shown in FIG. 3, then

(16) a second nut 11 and a spring washer (not shown) are positioned along shaft 1 as shown in FIG. 3, then

(17) form 12 is connected to the pawl and ratchet system 13, then

(18) the pawl and ratchet system 13 is connected to form 14, then

(19) the combination of form 12 together with the pawl and ratchet system 13 together with form 14 is connected to shaft 1 as shown in FIG. 1 and FIG. 3, then

Figure 2:
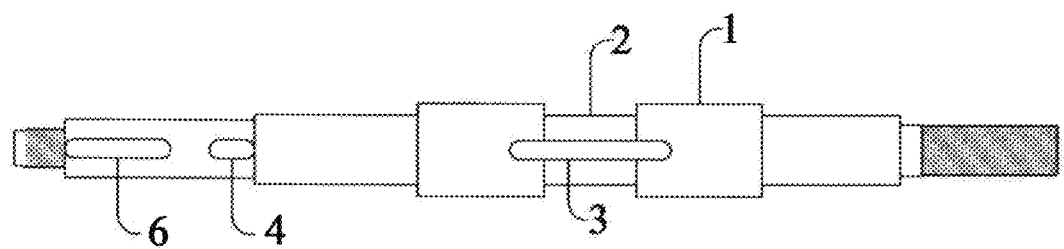
FIG. 2 is a plan of rotary shaft 1 and shows partial housing 2 into rotary shaft 1, and housing 4 and 6 partially into rotary shaft 1, and shows key 3 partially into rotary shaft 1.
Figures 7, 8, 9:
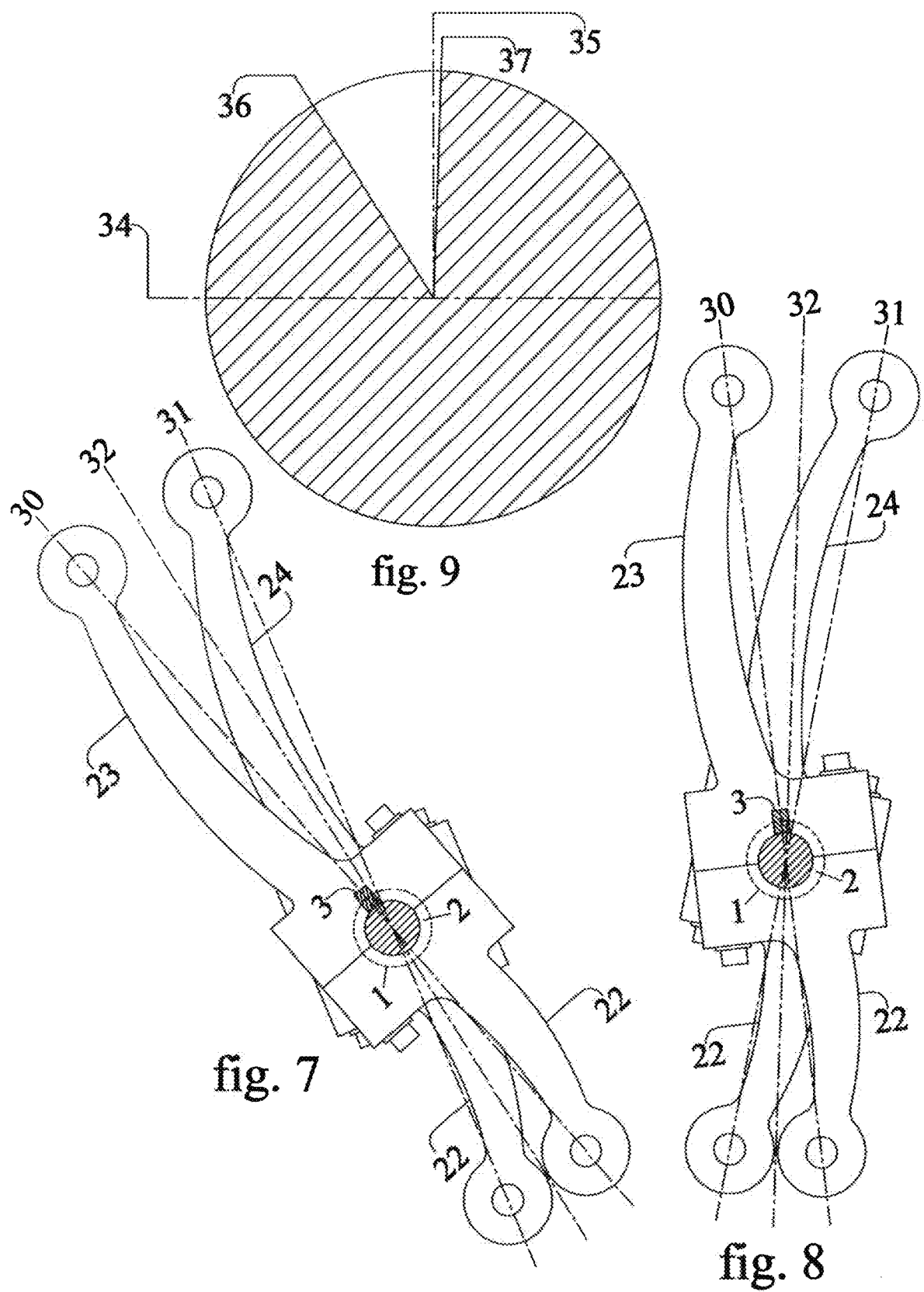
FIG. 7 is a cross sectional elevation of the two forms showing the misalignment between cross-sectional longitudinal axis 30 and cross-sectional longitudinal axis 31 when axis 32 is positioned as represented by line 36 in FIG. 9.
FIG. 8 is a cross sectional elevation of the two forms showing the misalignment between cross-sectional longitudinal axis 30 and cross-sectional longitudinal axis 31 when axis 32 is positioned as represented by line 37 in FIG. 9.
FIG. 9 is a representation of the portion of each rotation during which a motor's shaft, when connected to this invention, can operate being from Line 36 to Line 37, and does not operate from Line 37 to Line 36. The positioning of axis 32 simultaneously with the positioning of the rotary shaft and the two forms as misaligned, described at activity (2) at P. 2, L. 24 to P. 3, L. 2 is one critical factor in how this invention operates.

(20) key 3 is partially inserted into shaft 1 as shown in FIG. 2, then

(21) rod 24 is mounted over key 3 and held in that position until rod 24 is combined to rod 22 via bolts 29 to become a pair of combined dissimilar length rods, as shown in FIG. 6, then

(22) rod 23 is mounted over key 3 and held in that position until the other rod 22 is combined to rod 23 via bolts 29 to become a pair of combined dissimilar length rods, as shown in FIG. 5, then

(23) bolt 27 is inserted through the hole in weight 25 and inserted through the hole at the end of the non-connected end of rod 22 and inserted through the hole in weight 25 on the other side of rod 22, and a nut 28 is threaded onto bolt 27, then

(24) the activity described at (16) is repeated for the other rod 22, then

(25) another bolt 27 is inserted through the hole in weight 26 and inserted through the hole at the end of the non-connected end of rod 23 and inserted through the hole in weight 26 on the other side of rod 23 and a nut 28 is threaded onto bolt 27, then

(26) the activity described at (25) is repeated for rod 24.

The connection of a driver gear to a shaft is well within prior art and need not be described. However, when a driver gear is required, the spacer, referred to at P. 5, L. 3, is removed and replaced by the driver gear connected to the rotary shaft 1 via a key (not shown) partially housed into rotary shaft housing 6 and partially housed into the driver gear. The lock nut (not shown) is retained and operates to prevent the driver gear moving horizontally. The driver gear can be part of a gear train configured to enable the driven gear to be connected to, such as, a generator's shaft to enable rotation of the generator's shaft at the generator's rated speed.

INDUSTRIAL APPLICABILITY or UTILITY

This invention, as disclosed above and shown in the drawings, was designed to enable it to operate when activity numbered (1) to (5) inclusive described at P. 2, L. 22 to P. 3, L. 16 above were caused to occur prior to a motor operating for, such as, rotating a generator's shaft of a permanent magnet generator having a starting torque of less than approximately 0.5 Nm.

It should be understood that for activity numbered six at P. 3, L. 17 to 22 to occur, then a motor's starting torque will need to be greater than the combination of the generator's starting torque and the starting torque of, as relevant, shaft 1, the two forms as misaligned, and when connected, weights 25 and 26.

The following is provided as an example of this invention as it can operate with a motor to describe its Industrial Applicability or Utility, and on the basis that activities numbered (1) to (5) were caused to occur and activity number (6) was the consequence of said activities (1) to (5): the generator can be as described at P. 9, L. 14 and 15 above, having a starting torque of less than 0.5 Nm. The combination of rotary shaft 1, the two forms as described at P. 1, L. 23 to P. 3, L. 8 as chosen by the inventor, described at P. 4, L. 7 to 10, and weights 25 and 26, as described at P. 6, L. 12 to 15, has a starting torque of approximately equivalent to 2 kg being approximately 20 Nm which is forty times greater than the generator's starting torque of less than 0.5 Nm. It should be understood that, in this instance, it is desirable and useful to decrease the approximate 20 Nm torque to closer to the generator's starting torque of less than 0.5 Nm. The decrease, in this instance, can occur by simply removing weights 25 and 26 from the two forms which reduces the starting torque from approximately 20 Nm to approximately 2 Nm whilst everything else remains the same. Such decrease has an effect on the motor. The motor does not have to have a starting torque of approximately 20 Nm and can, in this instance, have a staring torque of not less than 3 Nm, which can reflect on the size and weight of the motor and the motor's purchase cost.

Starting torque is greater than running torque. In this instance, when the activities numbered (1) to (5) at P. 2, L. 22 to P. 3, L. 16 are caused to occur, then activity numbered six described at P. 3, L. 17 to 22 can occur by use of a motor with starting torque of not less than 3 Nm. This is sufficient torque to rotate the generator's starting torque of approximately 0.5 Nm, and simultaneously to rotate this invention's rotary forms of approximately 2 Nm with a safety factor of approximately 0.5 Nm.

While the description at P. 9, L. 11 to P. 10, L. 12 above has been described with respect to the starting torque of a generator as described at P. 9, L. 14 and 15 above, it should be understood that this invention is not so limited. Rather, many modifications may be made to, such as, the rotating shaft, the form, weights, and ratchet without departing from the scope of this invention as claimed and contemplated by the inventor.

The invention claimed is:

1. A system characterised by having a rotary shaft connected to two forms having each form characterised by having the length between one end of the cross-sectional longitudinal axis to the rotary shaft's axis of rotation dissimilar to the length between the other end of the cross-sectional longitudinal axis to the rotary shaft's axis of rotation and with misalignment between the cross-sectional longitudinal axis of one of the two forms to the cross-sectional longitudinal axis of the other of the two forms, and by having the rotary shaft connected to a different form connected to a pawl and ratchet system that can connect to a motor's shaft, and by having the rotary shaft connected to a further ratchet which can operate with a pawl, and with the rotary shaft that can connect to a driver gear.

2. A system according to claim 1 wherein the rotary shaft is connected to two or more forms or features, and with one end of the rotary shaft that can operate with a pawl and ratchet system in the form of a one way clutch that can operate with a motor's shaft and with the other end of the rotary shaft that can operate with a further ratchet and pawl system in the form of a one way clutch, and with the rotary shaft that can operate with a driver gear.

3. A system according to claim 1 or 2 wherein each form is further defined by having two connected dissimilar cross-sectional length forms each in the shape of a rod.

4. A system according to claim 1 or 2 wherein each form is further defined by having two connected dissimilar cross-sectional length forms each in the shape of a rod having a weight in proximity to each non-connected end.

5. A system according to claim 1 or 2 wherein each form is further defined by having two connected dissimilar cross-sectional length forms each in the shape of a rod having a weight in proximity to each non-connected end and on both sides.

* * * * *